Oct. 29, 1963 L. MESTRE 3,108,797

COLLATOR WITH FIXED STORAGE POCKETS

Filed April 30, 1962 8 Sheets-Sheet 1

INVENTOR
LUIS MESTRE
BY
John M. Montstream
ATTORNEY.

Oct. 29, 1963 L. MESTRE 3,108,797

COLLATOR WITH FIXED STORAGE POCKETS

Filed April 30, 1962 8 Sheets-Sheet 2

INVENTOR
LUIS MESTRE

BY

John M. Montstream

ATTORNEY.

INVENTOR
LUIS MESTRE
BY
John M. Montstream
ATTORNEY.

Oct. 29, 1963 L. MESTRE 3,108,797

COLLATOR WITH FIXED STORAGE POCKETS

Filed April 30, 1962 8 Sheets-Sheet 4

INVENTOR
LUIS MESTRE
BY
John M Montstream
ATTORNEY.

COLLATOR WITH FIXED STORAGE POCKETS

Filed April 30, 1962 8 Sheets-Sheet 5

INVENTOR
LUIS MESTRE
BY
John M. Montstream
ATTORNEY.

INVENTOR
LUIS MESTRE
BY
John M. Montstream
ATTORNEY.

INVENTOR
LUIS MESTRE
BY John M Montstream
ATTORNEY.

INVENTOR
LUIS MESTRE
BY
John M. Montstream
ATTORNEY.

United States Patent Office 3,108,797

Patented Oct. 29, 1963

3,108,797
COLLATOR WITH FIXED STORAGE POCKETS

Luis Mestre, 305 E. 46th St., New York, N.Y.

Filed Apr. 30, 1962, Ser. No. 191,141
17 Claims. (Cl. 270—58)

The invention relates to a collator having a plurality of adjacent storage pockets for the sheets to be collated. These pockets are fixed in position and the sheets are partially ejected from the selected pockets whereupon a belt means completes the withdrawal of the sheets from the pockets and transports them in staggered relation to a stop where the sheets are aligned. The book of sheets is gaged at the stop for thickness and then passes them on to a deposit platform if proper or to a reject position. The collator ejects the sheets simultaneously from the selected pockets or preferably in rapid sequence from the bottom or remote pocket first and then sequentially from each succeeding pocket.

It is an object of the invention to construct a collator in which the storage pockets are stationary.

Another object of the invention is to construct a vertical collator in which the sheets are ejected from the storage pockets substantially simultaneously.

Another object of the invention is to eject the sheets from successive pockets in rapid sequence.

It is another object of the invention to construct a collator having very high capacity such as 45,000 sheets an hour with a collator having fifteen storage pockets.

Another object is to construct a collator capable of collating one or a plurality of books of sheets as desired.

Another object of the invention is to construct a relatively inexpensive collator having ability to collate one or more books of sheets as desired.

Other objects of the invention will be more apparent from the following description when taken in connection with the accompanying drawings illustrating a preferred embodiment thereof in which.

Figures 1A, 1B:
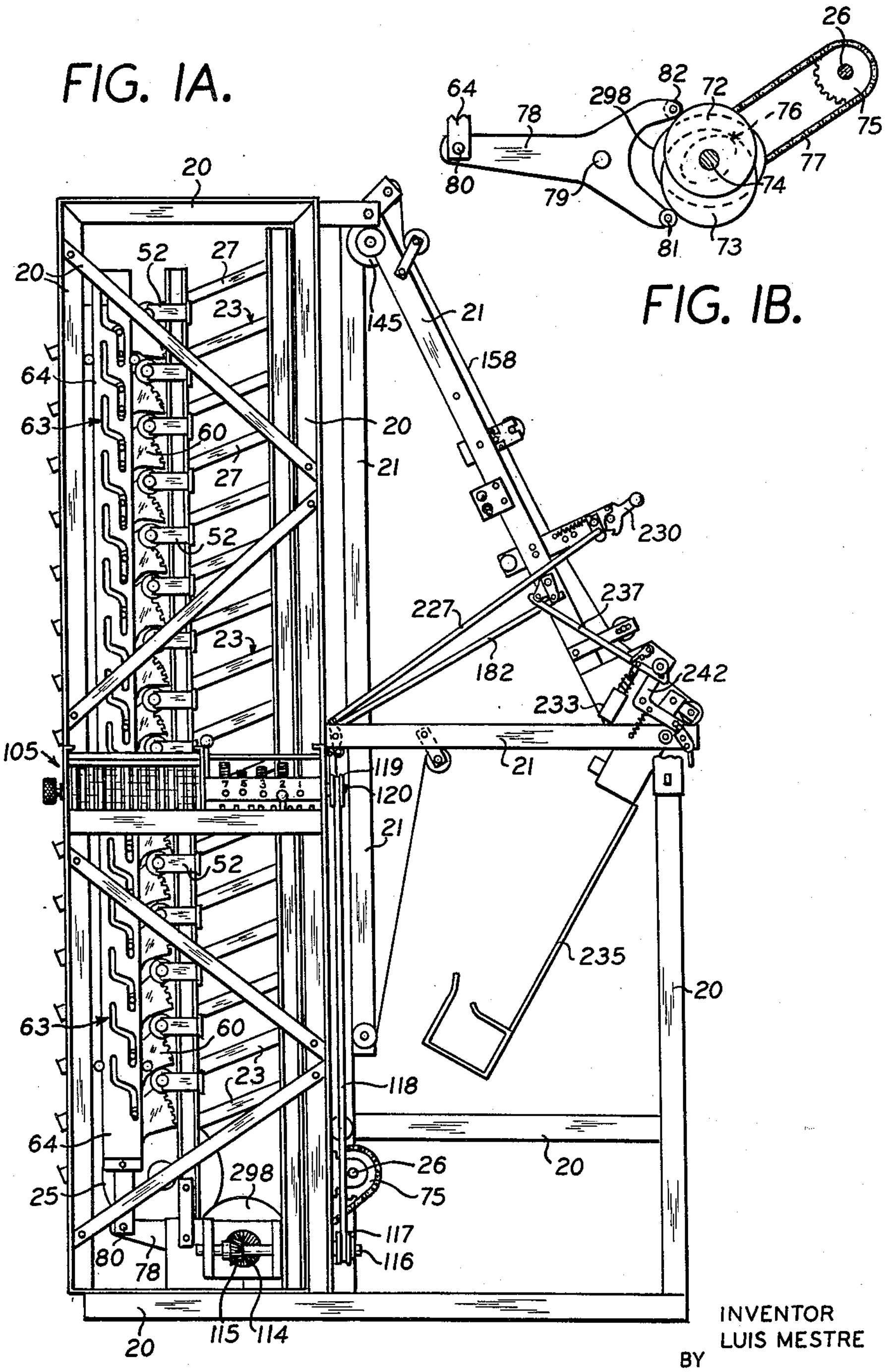
FIG. 1A is a side elevation of the collator.
FIG. 1B is an enlarged view of the cam bar operating cams.

The collator includes a main frame 20 of suitable construction and an auxiliary frame 21 pivotally mounted on the main frame on a pivot 22, FIG. 15, as will appear more fully hereinafter. Mounted in the frame 20 are a plurality of inclined and spaced partitions or shelves 23 having a flange 27, each shelf forming a storage pocket for a pile or stack of sheets S to be collated. In the collator illustrated the shelves are in a vertical stack although this arrangement is not essential. A different sheet of the book is inserted in each pocket and the collator partially ejects a sheet from each pocket or selected pockets and a belt means completes the withdrawal of the sheets from the pockets in a manner to be described hereinafter. The auxiliary frame carries the belt means and other mechanism and the hinge 22 enables the belt means to be pivoted away from the pockets so that the latter are open from the ejecting side and can be loaded with sheets from their right hand side as viewed in FIG. 1. The collator is driven by a suitable motor 25 connected with a main shaft 26 rotatably mounted on the frame.

A sheet ejector of a suitable construction is provided for each storage pocket which engages the top sheet in a pile of sheets therein and partially ejects or projects the top sheet outwardly from the pocket towards the right or ejection end as viewed in FIG. 1. The ejector illustrated includes a pair of spaced ejector wheels 29, FIGS. 4 and 6 (one shown), rotatably mounted on each side of an arm 30 on a wheel shaft 31. The wheel shaft carries a driven sprocket 32 which receives a drive chain 33 and the chain is driven by a drive sprocket 34 fixed to an ejector shaft 35. This shaft also forms the pivot for the ejector arm 30. The ejector shaft and pivot is rotatably mounted in the flange 27 of the partition 23 or a plate 36 carried thereby and a bracket 37 carried by a partition in the side wall 24 for the pockets and the flange 27 of a partition or shelf 23.

Figure 2:
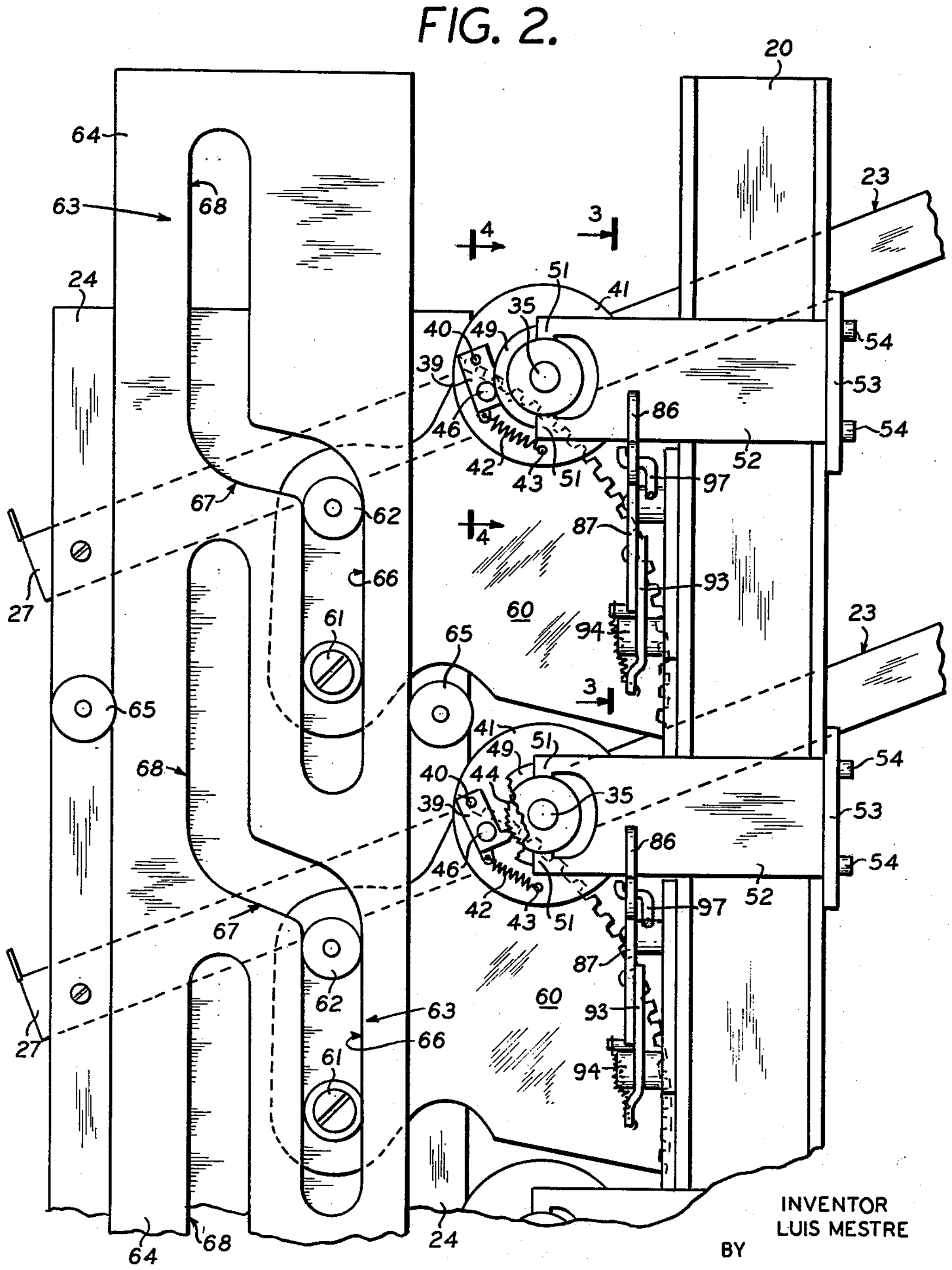
FIG. 2 is an enlarged detail of the sheet ejector.

Mounted or carried on the ejector shaft 35 is a suitable clutch, that illustrated being a ratchet type, FIG. 2, including a pawl 39 pivotally mounted on a pin 40 carried by a pawl disc 41. A spring 42 has one end secured to the pawl and the other end is fixed to a pin 43 carried by the pawl disc. The spring propels the pawl inwardly into contact with a ratchet wheel 44 which is secured to the ejector shaft 35 such as by a pin 45. The pawl carries a projecting pawl pin 46.

A clutch element is slidably mounted on the ejector shaft 35 and includes a clutch disc 49 of such diameter that the periphery engages the projecting pawl pin 46 and projects it and the pawl radially and holds the pawl away from contact with the ratchet wheel 44. The disc preferably carries an angular corner surface. This clutch element has a groove 50 in which is received the end or fingers 51 of a clutch bar 52. The clutch bar is pivotally supported at one end on a bracket 53 carried by the frame which pivotal support may be a simple one with the end of the clutch bar having a pair of spaced projections 54 received in slots in the bracket and then the projections are twisted. This clutch bar slides the clutch disc 49 to and from pawl engaging and disengaging position by mechanism which will be described hereinafter.

Ejector driving means is provided to operating the sheet ejector. The pawl disc 41 is secured to a bushing 55, FIGS. 5 and 6, to which is secured a pinion 56. The pawl disc, bushing and pinion are freely rotatable on the shaft 35. The pinion 56 meshes with a segmental gear 60 which is pivotally mounted on the side wall of the storage means or pocket on a pivot 61, FIG. 2. Each segmental gear, FIG. 16, carries a cam follower 62 which is spaced from the pivot. This cam follower is received in a cam slot 63 carried by a cam bar 64. The cam bar is mounted on the frame from crosswise movement relatively to the sheet storage pockets so that with vertically disposed pockets the bar is mounted for vertical movement by rolls 65 carried by the side wall 24. Each cam slot has a straight terminal leg 66, or lower leg, an operating portion 67 extending angularly and laterally at the upper end thereof and a straight terminal leg 68 or upper leg. The legs 66 and 68 are parallel to each other in spaced relation.

When the cam bar is moved downwardly, the segmental gear cam follower 62 is projected to the left by the operative portion 67 of the cam slot and rotates the segmental gear 60 in a contra-clockwise direction and the pinion 56, and pawl disc 41 in a clockwise direction. This rotation of the segmental gear and pawl disc merely turns the pawl 39 relatively to the ratchet wheel 44. On upward movement of the cam bar, the operating portion 67 of each cam slot turns its segmental gear in a clockwise direction and rotates the pinion and the pawl in a cortra-clockwise direction to turn the ejector shaft 35, the drive sprocket 34, drive chain 33, driven sprocket 32 and the ejector wheels 29 in the same direction as viewed in FIG. 6 to project the top sheet of the pile of sheets S partially out of its pocket or to the right.

The cam bar is oscillated, or moved vertically upwardly and downwardly, by any suitable reciprocating means, the means illustrated including a pair of spaced cams 72, 73, FIG. 1B, carried and rotated by a cam shaft 74 and operatively driven from the main shaft 26 by sprockets 75 and chain 76 therebetween. A cam bar lever 78 is pivotally mounted on the frame on a pivot 79 and is pivotally attached to the cam bar by a pivot 80. This lever carries a cam follower 81 engaging the cam 73 to propel the cam bar upwardly and another cam follower 82 is carried by the lever which engages the other cam 72 to propel the cam bar downwardly. The forked shape of the lever 78 and the two cams is the equivalent of a slotted cam.

There is a cam slot 63 in the cam bar for each ejector and hence for each pocket. These cam slots may be spaced from each other a distance corresponding with the spacing between the pivots 61 for the segmental gears in which event all segmental gears and ejector wheels will be operated simultaneously and a sheet is ejected from each of the pockets simultaneously. Preferably, however, the spacing between the cam slots is a little less than the spacing between pivots 61 of adjacent segmental gears. In a full sized collator, the cam slots are actually spaced apart approximately $\frac{9}{64}$ of an inch less than the spacing between segmental gear pivots. As a consequence when the cam bar is moved on its ejection stroke or upwardly, the segmental gear follower roll 62 for the first or lowermost segmental gear reaches the operating portion 67 of its cam slot first to start oscillating of its gear segment. Each succeeding gear segment begins its oscillation at a slightly later time and so on for the successive segmental gears to the last or topmost one or for the length of the cam bar. One result is that with the angle of the operating portion 67 of the cam slot as shown of about 110°, there are about five segmental gears and ejectors only being operated at one time.

There is a double function or purpose in this relationship in that the power drain on the motor is lessened by driving at one time a fewer number of segmental gears and their connected ejector structure rather than all at one time. A second purpose is that the leading edges of the sheets as they are ejected out of the pockets are spaced substantially a shorter distance apart. In other words, if the gear segments were operated simultaneously, the leading edge of each sheet ejected from its pocket would be spaced from the leading edge of the sheets from the adjacent pockets by the spacing between pockets. This spacing of the leading edges of the sheets is substantially reduced by the successive operation and brings the leading edges of the sheets of each book in closer overlying relation in proportion to the progressive operation of the gear segments. With the relationship mentioned as to spacing between cam slots 63, the leading edges of the transported sheets in the belt means is about one half the spacing between pockets. By bringing the cam slots still closer together, the leading edges can be brought into or approximately into alignment.

Figures 3, 4, 5, 9:
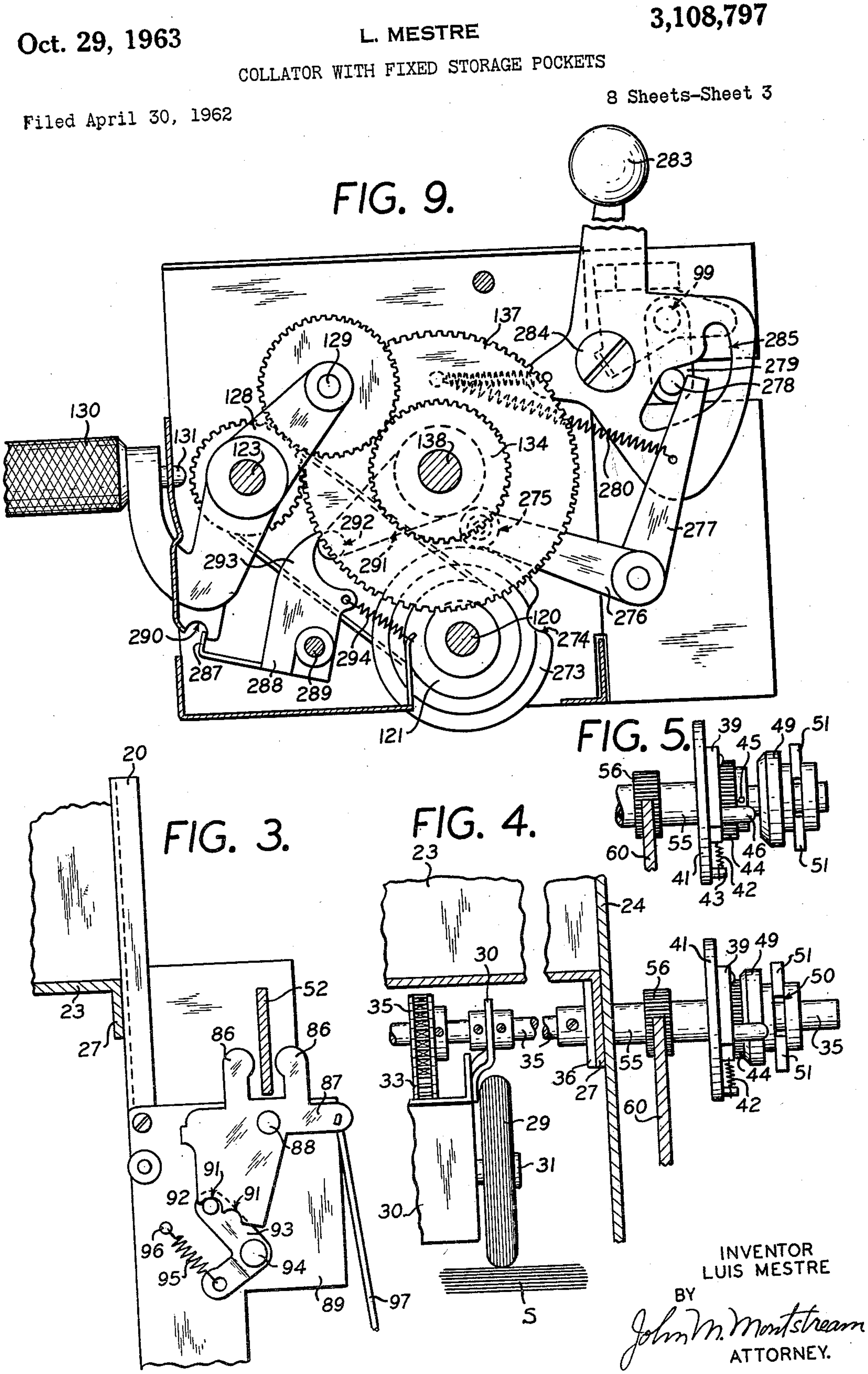
FIG. 3 shows details of a clutch operator for the sheet ejecting means.
FIG. 4 shows the sheet ejector with clutch and drive means.
FIG. 5 shows the sheet ejector clutch in operative position.
FIG. 9 is a section taken on line 9—9 of FIG. 7 through the gear transmission mechanism.

The collator ejector is operable without any additional structure other than the clutches as described. If the book comprises ten pages, the pockets one to ten are loaded and the clutch disc 49 for each of these pockets is moved manually away from pawl pin to place the pawl in operative contact with its ratchet wheel. Each of the other pawls, FIG. 4, is held by its clutch disc away from its ratchet wheel since there is no need to rotate the ejector wheels for unloaded pockets. Without additional structure, however, the collator can collate sheets for one book solely. In order to broaden the usefulness of the collator so that it can be set up to collate two or more books at one time, selector mechanism is provided as will now be described.

The selector mechanism includes clutch operating means for each clutch in order to engage and disengage the same for each cycle of operation of the collator. One only of the clutch operating means will be described since they are all the same. In FIGS. 2 and 3, the clutch bar 52 is received in a slot between a pair of spaced fingers 86 carried by a finger lever 87 which lever is pivotally mounted on a pivot 88 carried by a bracket 89 carried by the frame. The finger lever carries a pair of adjacent retaining notches 90, 91 spaced from the pivot in which retaining notches is received a pin 92 carried by a pin lever 93 pivotally mounted on a pivot 94 carried by the bracket. A spring 95 having one end attached to the lever and the other end fixed to pin 96 projects the pin into a retaining notch. In the position shown particularly in FIG. 3, the clutch is retained in clutch open or pawl disengaged position, that is the clutch disc 49 is in the position of FIG. 4. The other notch 91 retains the finger lever and the clutch disc in clutch engaged position of FIG. 5. These notches merely provide a light resistance against movement of the clutch disc. The finger lever has one end of an operating connection or connecting wire 97 suitably attached thereto and this operating wire extends downwardly to a clutch operating lever or plate, 98, FIG. 8, to which the other end of the wire is attached. The connecting wire is stiff enough so that it will pivot the finger lever in either direction. This and each operating plate is pivotally mounted on a pivot 99 carried by a drum housing 100. There is an operating plate for each clutch and hence for each storage pocket and all are mounted on the pivot 99, FIG. 7, in spaced relation. Each operating lever carries a laterally extending operating finger 101 spaced from the pivot.

Adjacent to the series of clutch operating levers 98 is a selector cylinder means secured or keyed to a shaft 106 rotatably carried by the end walls of the drum housing 100 and comprising a plurality of selector plates 107. A selector plate is provided for each clutch operating lever 98 and each selector plate has a plurality of operative selector notches 108 in the periphery thereof, one such notch being provided for each storage pocket. An inoperative notch 109 which is not as deep, is provided between each operative selector notch. An adjustable selection finger 110 is provided for each selector plate which finger is rotatably mounted on the selector plate and between selector plates. Each selector finger projects radially beyond the periphery of the or its selection plate. The finger has lateral resiliency so that it can be shifted free of the notches and moved circumferentially with respect to its selector plate and then inserted into any one of the operative or inoperative selector notches in its respective plate. When a selection finger is in an inoperative notch the finger is located or retained in a position to pass by the operating finger 98. These selector plates are rotated together as a unit and when the projecting selector finger engages the projection 101 on the clutch operating lever 98, it pivots the same and pulls downwardly on the connecting wire 97 for a clutch above the same and pushes downwardly on the wire for a clutch below the same and thereby shifts the clutch disc away from the pawl. The pawl engages the ratchet so that oscillation of the gear segment rotates the ejection roll and ejects a top sheet from the pocket.

Reset means is provided to automatically restore the clutch discs 49 to pawl lifted position or clutch disengagement. This means includes a reset cam 273, FIG. 9, mounted on the drive shaft 120 and having a notch 274 therein. This reset cam rotates once for each cycle of operation of the collator. When a cycle is completed a cam follower 275 carried by a bell crank lever 276 falls into the notch. The arm 277 of this bell crank lever engages a reset rod 278, which extends adjacent to each of the operating levers 93, FIG. 8, when in closed clutch position. The reset rod is carried on arms 279 pivotally carried by the pivot 99. A spring 280 attached to the arm 277 normally propels the reset rod to the left as viewed in FIG. 9, however, the periphery of the reset cam 273 prevents movement. When the cam follower 275 drops into the notch 273, the bell crank lever is pivoted in a counterclockwise direction and the reset rod is moved to the left so that it engages the back edge of the selector operating levers and restores them to initial position, that is, in a position in which the clutch discs 49 raise the pawls 39 away from the ratchet wheel 44. Resetting of the selector operating levers may also be achieved manually by the handle 283 which is pivotally mounted on the housing on a pivot 284. This handle or manual reset lever carries a slot 285 for engaging the reset rod so that by swinging the reset lever to the left as viewed in FIG. 9, the reset rod is also projected to the left to reset the selector operating levers.

In order to maintain the proper timing of the selector mechanism when a gear shift is made an interlocking arrangement is provided such that the selector drum is in proper position. This interlock mechanism includes a locking lever 288 having a locking ledge 287 pivotally mounted on the selector housing on a pivot 289 and this lever engages in a locking notch 290 carried by the gear shift carriage. A spring 294 normally keeps the ledge 287 engaged in the notch. The gear carriage cannot be shifted so long as the end of the interlock lever is in the notch. The interlock is released when the selector drum is in proper position by means of a release lever 291 carried on the gear shaft 138 which is extension of selector cylinder shaft 106. This lever carries a roll 292 which engages an arcuate finger 293 also carried by the lever 288. Consequently when the selector drum is in proper position, the interlock lever is propelled in a counterclockwise direction to withdraw the locking ledge from the locking notch 290. As a consequence the gear shifting lever can be shifted solely when the selector drum is in proper position to release the interlock.

The selector cylinder means is, or the selector plates thereof are, rotated by a gear change mechanism 113 and a gear ratio is set depending upon the number of books which are to be collated. In other words, if there is one book only to be collated irrespective of the number of pages in the book, or pockets of the collator to be loaded, then the gear mechanism is adjusted so that the selector cylinder means rotates once for each cycle of operation of the collator. One cycle is the downward and upward movement of the cam bar 64. If, however, the pockets are loaded with sheets for two books, then the gear change mechanism is adjusted so that the selector cylinder means is rotated one half revolution for each cycle of operation of the collator so that first, the sheets of one book are ejected and transported through the collator after which the sheets of the second book are ejected from their respective pockets and transported through the collator. By a like token if the machine is loaded for three books, the gear change means is adjusted so that the selector cylinder means is rotated one third revolution for each cycle of the collator. The gear change mechanism particularly shown is designed to accommodate the collator for one, two, three, five and seven books although gears could well be provided for four and six books as well.

Figures 6, 7, 8:
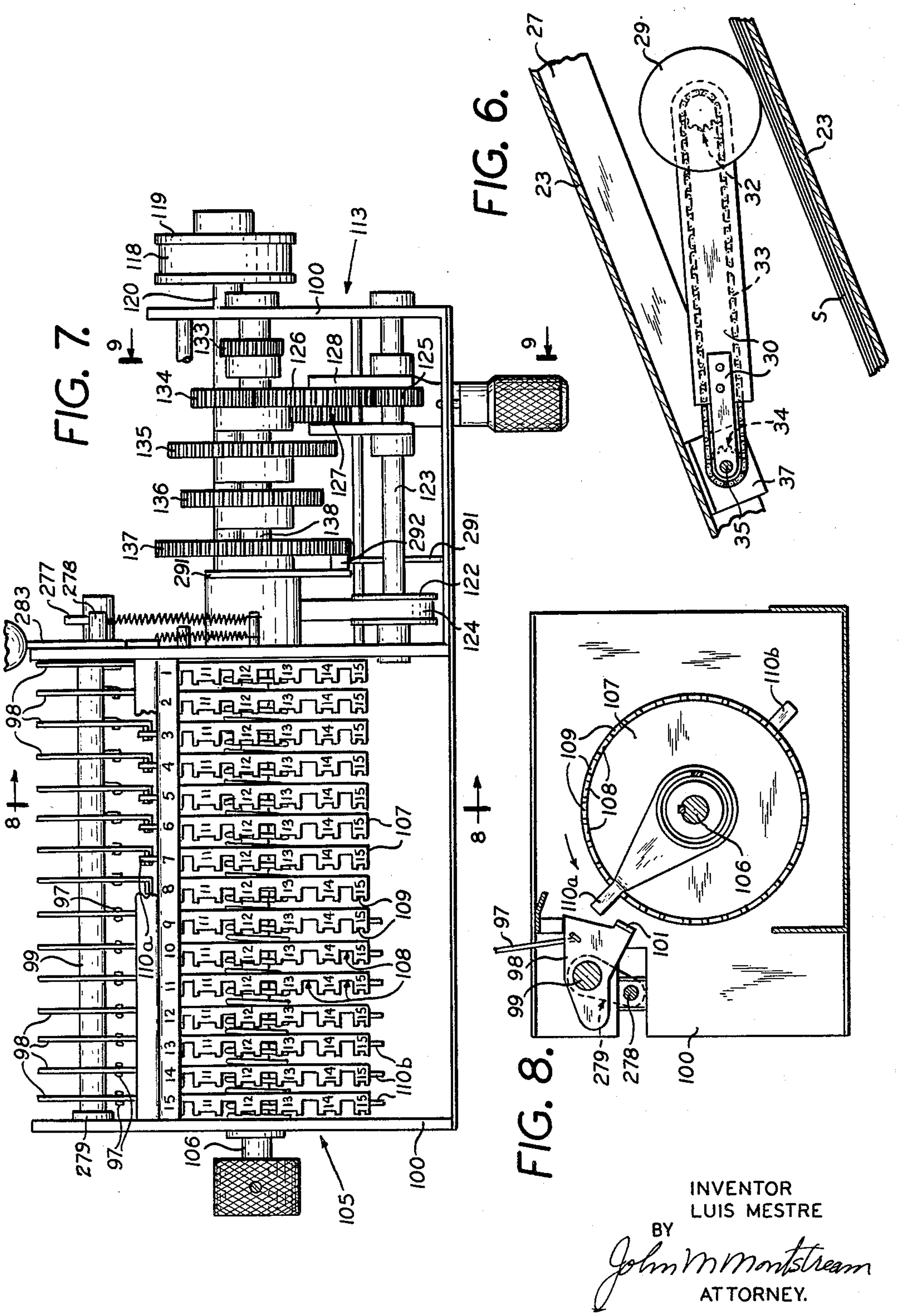
FIG. 6 is a side view of the drive connection to the ejector.
FIG. 7 is a plan view of the ejector selecting mechanism.
FIG. 8 is a section taken on line 8—8 of FIG. 7 showing a clutch operator.

The gear change mechanism shown is driven from the cam shaft 74, FIG. 1, by a bevel gear 114 which meshes with a bevel gear 114 carried on a cross shaft 116 and this shaft carries a belt pulley 117 driving a cogged belt 118 and pulley 119 carried by a drive shaft 120, FIGS. 7 and 9. The drive shaft carries a second pulley 121 which is connected to a pulley 122 on a jack shaft 123 by a cogged belt 124. A shiftable gear train, includes a driving gear 125 and a connecting gear 126 meshing therewith and a third gear 127 secured to the connecting gear to form a compound gear. This gear train is carried by a gear carriage 128 which is movable laterally along the jack shaft in order to select the gear ratio for properly rotating the selector cylinder means for the number of books to be collated. The carriage has a handle 130 for shifting the carriage and a pin 131 is received in a hole in the housing to retain the carriage in position. The driving gear 125 of the gear train is keyed to the jack shaft so that it is driven thereby. The compound gears 126, 127 are rotatably mounted on the carriage by a pin 129. The gear train may be meshed with any one of the five driven gears 133, 134, 135, 136 and 137, which are secured to a gear shaft 138 which is in effect the shaft 106 for the selector cylinder means since its end is coupled thereto so that it is rotated thereby. The gears 133, 134 and 135, have a ratio of 1, 2 and 3 with respect to the drive gear 125 with the gear 126 serving as an idler or connecting gear. Gears 13 and 137 are meshed with the gear 127 of the compound gear to give a gear ratio of 5 and 7 respectively. With the gear train in position to mesh with gear 134, as shown, the selector means 105 is set up for two books and is rotated one half revolution for each cycle of operation of the collator.

Figures 10, 12:
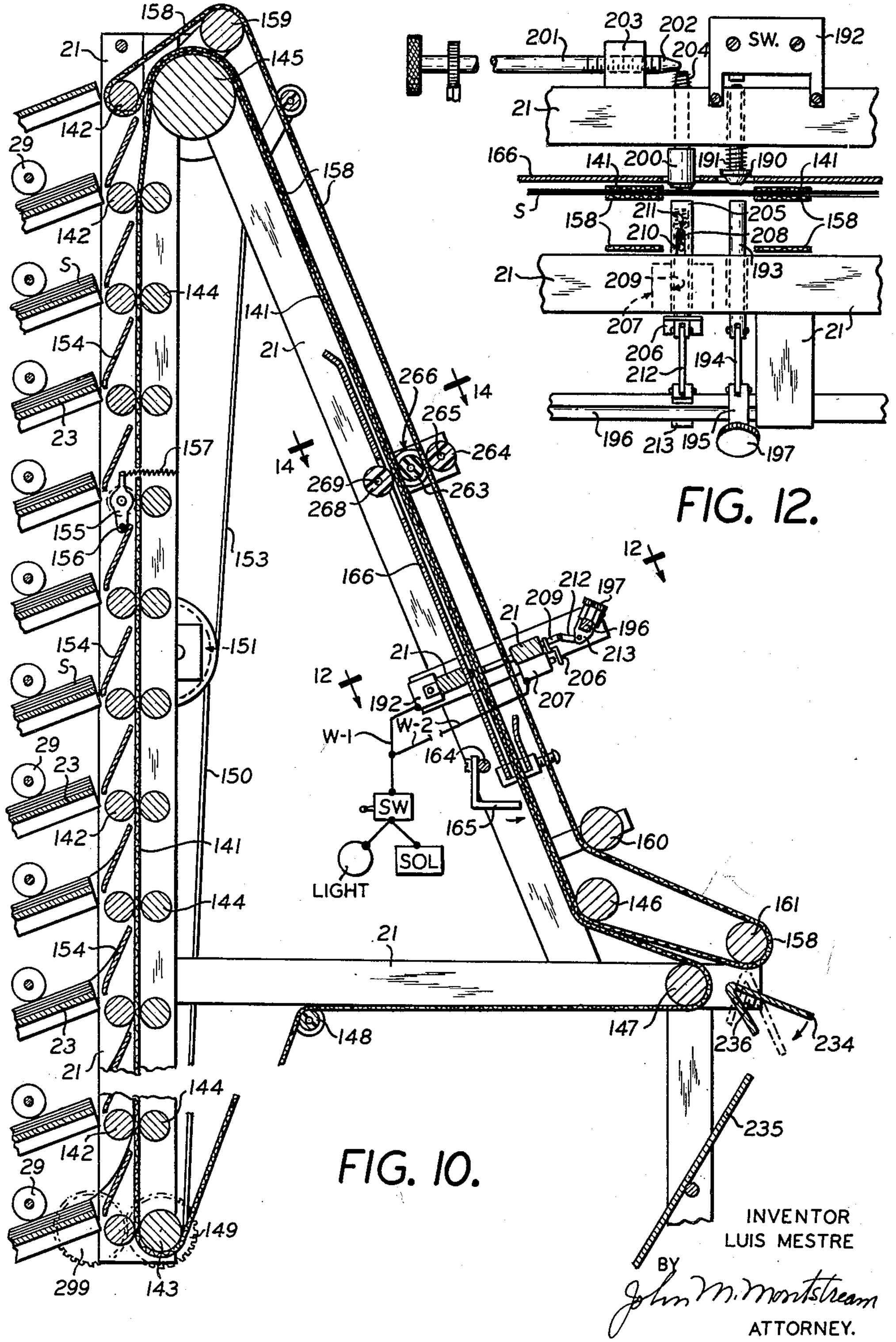
FIG. 10 is an enlarged view of the belt means for completing withdrawal of and transport of sheets partially ejected from the storage pockets.
FIG. 12 is a view taken on line 12—12 of FIG. 10 showing the book gaging means.
Figure 11:
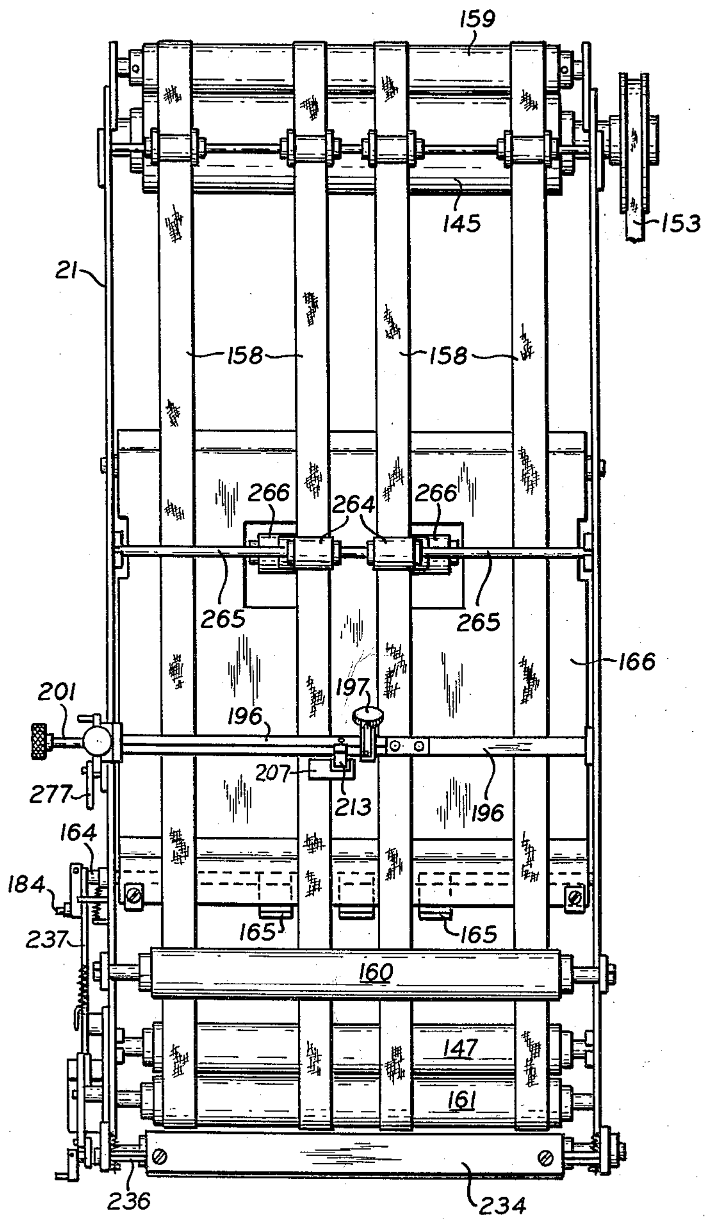
FIG. 11 is a front view of the belt means.

The top sheet ejected from each of the pockets is projected to the right as shown in FIG. 10 until the end of the sheet is picked up by transporting means. This means includes a feed belt 141 and the sheet is projected between a pressure roll 142 provided for each pocket and the feed belt to complete the withdrawal of the sheet from its pocket and also to transport all of the ejected sheets from the pockets in overlapping relation to a stop and gaging station as will appear. This belt transport means includes a series of parallel spaced belts, four being shown, which pass around a lower roller 143 below the bottom or first pocket and passes upwardly between a series of pairs of rollers each pair including a back up roller 144 and a pressure roller. One such pair of rollers is provided for each pocket and is located adjacent the upper level thereof. The belt then passes around a top roller 145 adjacent the top of the top or last pocket and then is shown as extending angularly downwardly, although this is not an essential direction, around an idler roller 146 and an end roll 147 then around a tension roller 148 back to roller 143. The rollers 143 and 145 are drive rollers in that the first is driven by a gear 149 connected with the main shaft 26 of the collator. A belt connection including a belt 150 and pulley 151 and another pulley 152 and belt 153 driving the upper roll 145. An angle guide plate 154 is carried by the frame 21 for each pocket extending adjacent to the nip of the belt and pressure roll 142 to positively direct the leading edge of each ejected sheet into contact with the belt and between the pressure roll and the transporting belt. Each end of the pressure rolls 142 are rotatably mounted in a bracket 155 pivoted to the frame 21 on pivot 156 and a spring 157 pulls the roll towards the belt.

The transporting means includes an auxiliary belt means having an inner and outer pass keeps the book of sheets together from the top of the belt transport means. This auxiliary belt means includes an auxiliary belt 158 which is held in contact with the transporting belt 141 as it passes around the top or end roller 145 by a pair of rollers including the top pressure roll 142 and a roller 159 both of which are adjacent to the top roller. The inner pass of the auxiliary belt is in contact with the transporting belt as it passes around the top roller and also for the inclined portion of the two belts. The auxiliary belt then is guided at a different angle or more nearly horizontally as it passes around idler rollers 146, 160 and around a terminal roller 161. The book of sheets is supported between the transporting belt and the inner pass of the auxiliary belt in the downward pass. The auxiliary belt is driven by its contact with the transporting belt.

Just beyond but adjacent the lower end of the inclined belt portion, a stop means is provided which is projected between the belts at a timed period for each cycle of the collator. The stop means is mounted on a pivot 164 carried by the frame 21 and constitutes a plurality of projecting or angle stops 165 which extend between the spaced belts of the transporting belt and the auxiliary belt. Means are provided to project and remove the stop from stop position. Preferably a spring 167 propels the stop to stop position and retracting means for withdrawing the same from stop position, which will be described hereinafter. When the stop is in stop position, the leading edge of the sheets of the book engage the projecting stops and the leading edges of all of the sheets are brought into alignment with the stop. A supporting panel 166 may be mounted adjacent to the transporting belts. There is additional feed means provided to aid this operation as will be described hereinafter.

The stop is projected and removed to and from stop position by stop operating mechanism shown in FIGS. 13. A stop cam 169 is mounted on the main shaft 26 and a stop cam lever 170 is pivotally mounted on a pivot 171 carried by the frame. This cam lever carries a cam follower 172 which engages the stop cam. A connecting linkage is provided between the cam lever and the stop means comprising a link 173 pivotally secured at one end by a pin 174 to the cam lever and the other end is pivotally attached by a pin 175 to a bell crank 176 mounted on a pivot 177 carried by the frame. The arm 178 of the bell crank engages a pin 179 carried by a lever 180 which is pivotally mounted on the frame on a pivot 181 and this lever is connected by a link 182 to an arm 187 which is secured to the pivot 164 carrying the stop. A jam connection is shown between the link and the arm which constitutes a slot 183 in the end of the link in which is received a pin 184 carried by the arm and a spring 185 connected between this pin and a pin 186 carried by the link normally propels the pin to the left hand end of the slot. The stop, therefore, is propelled by the stop means described to and from stop position once for each cycle of operation of the collator. The lever connections provide a separable connection so that the auxiliary frame 21 with its structure may be pivoted away from the main frame 20.

While the book of sheets is momentarily held in stop position, the book of sheets is gaged in order to determine whether or not there is an excess number of sheets (or too thick an assemblage of sheets) or a sheet or sheets are lacking or a thin book of sheets. This book gaging means is shown in FIG. 12. The gaging means in effect includes two gages, one which gages for an excess of sheets or too great a thickness and the other which gages for too few sheets or too thin a book of sheets. The gage for too thick a book includes a switch plunger or anvil 190 slidably mounted in the frame and which is pressed forwardly by a spring 191 into contact with the last or inner sheet of the book of sheets between the belt means. The end of this plunger is normally spaced from the contact button of a switch 192. The first or outer sheet of the book of sheets is engaged by an operating plunger 193 which is slidably mounted in the frame 21 and is connected by a link 194 with an arm 195 mounted on a pivot rod 196 so that this plunger is pressed into contact with the outer sheet (or upwardly as shown in the figure). The length of the arm 194 with respect to the pivot rod 196 is adjustable by a screw 197. If there is a proper number of sheets in the book, the switch plunger 191 is not moved hence the switch 192 remains open. If, however, the book is thicker such as by having one or more additional sheets in the book then the switch plunger is pressed far enough so that the switch is closed.

The other gage rejects a book of sheets which lacks a sheet or more or is thinner than normal and includes a fixed anvil 200 carried by the auxiliary frame 21 but the position of this anvil may be adjusted by any suitable means, that shown including a screw 201 with a tapered end 202 which screw is threaded into a nut 203 carried by the auxiliary frame 21. A spring 204 normally holds the end of the anvil in contact with the taper. The tapered end of the screw enables the position of the anvil to be adjusted. Cooperating with this anvil is a second switch plunger 205 slidably mounted in the auxiliary frame and having a switch operator 206 secured to the other end thereof to engage a second switch 207. The switch plunger is propelled towards the anvil by a spring 208 within the plunger and engaging the end of a push rod 209 slidably mounted within the plunger. A pin 210 carried by the push rod and slidable in a pin slot 211 in the plunger prevents the latter from turning. The push rod is attached by a pin to one end of a connecting link 212 and the other end of the link is pivotally secured by a pin to an arm 213 which arm is secured to the pivot rod. This spring pressed operating plunger 205 is advanced once for each cycle of the collator along with the advance of the first operating plunger 193. If the book has less than the proper number of sheets so that the book of sheets is too thin, the plunger 209 is advanced far enough so that the switch operator 206 engages the switch 207 to close the same. If the book of sheets is of proper thickness, the two switches remain open and nothing happens.

The gages are operated by oscillating the pivot rod 196 by a gage cam 217, FIG. 13, carried on the main shaft 26. The cam is engaged by a cam follower 218 carried by a cam lever 219 pivoted on a pivot carried by the frame. This lever is connected by a link 220 connected with the cam lever by a pivot 221 and the other end of the link is pivotally attached by a pivot 222 to a bell crank 223 pivotally mounted on the pivot 177. The arm 224 of this bell crank engages a pin 225 carried by a pivot lever 226 mounted on pivot 181. This connection provides a separable connection so that the auxiliary frame may be swung away from the main frame. This lever is connected by a link 227 to an arm 228 secured to the end of pivot rod 196. This arm is projected in a counterclockwise direction by a spring 229. Oscillation of this lever oscillates the pivot rod and the arms which, through the links propels the plungers towards their respective anvils and into contact with the book of sheets.

In order to adjust the gages, a lever 230 is mounted on a pivot 231 carried by the frame which lever has a notch 232 to engage the lever 228 or pin 228*a*. This lever holds the pivot rod 196 with the plungers advanced. With a book of sheets of the proper number of sheets in gaging position, the adjusting knobs are manipulated until its respective switch is closed as indicated by lighting of a signal light connected in parallel with the solenoid by a switch (not shown). The adjusting knob is then backed off about a quarter turn. This is done for both gages after which the signal light switch is operated to connect the solenoid in the switch circuit.

The two gaging switches 192, 207 are connected in parallel so that, if either of the switches is closed, a solenoid 233 is energized which controls the swinging of a reject means shown as a reject plate 234, FIG. 10, to a dot-dash position so that the book of sheets is bypassed from the deposit platform and is rejected to a discard rack 235. The reject plate is pivoted on a pivot 236 to reject or bypass position by being connected with and operated by the stop means and triggered by the solenoid or one of the gaging means. This connection includes a link 237 pivotally attached to the stop means on a pin 238 and the other end of this link carries a slot 239 which receives a slot pin 240 carried by one arm of the bell crank lever. The slot extends longitudinally of the link and a lateral portion 241 is provided at the end of the slot. A lever 242 is pivotally mounted on the frame on a pivot 243. The other arm 244 of this bell crank carries a slot 245 in which is received a pin 246 carried by a lever 247 which lever is secured to pivot 236 pivotally mounted on the auxiliary frame 21 and this pivot has the reject plate 234 secured thereto. A spring 248 has one end secured to the bell crank lever and the other secured to the frame propels this lever in a clockwise direction which normally holds the reject plate in normal position for directing a proper thickness of book of sheets over the reject plate onto a deposit platform (not shown).

The solenoid armature is connected with means to render the link 237 operative to swing the reject plate 234 to reject position and reject a book and to release the link from operative position so that the reject plate returns to normal position. This means includes a latch carrier 252 secured to the armature. A spring 253 normally projects the armature to normal position. A latch 254 is pivotally mounted on a pivot 255 carried by the latch carrier and a latch spring 256 serves a double function in that it propels the latch in a counterclockwise direction so that a surface 257 on the latch engages a latch pin 258 carried by the carrier and also propels the link 237 to normal position with the pin 240 in the longitudinal portion of the slot 239. A latch notch or shoulder 259 is carried by the latch normally located below the latch pin.

Figures 13A, 13B, 13C:
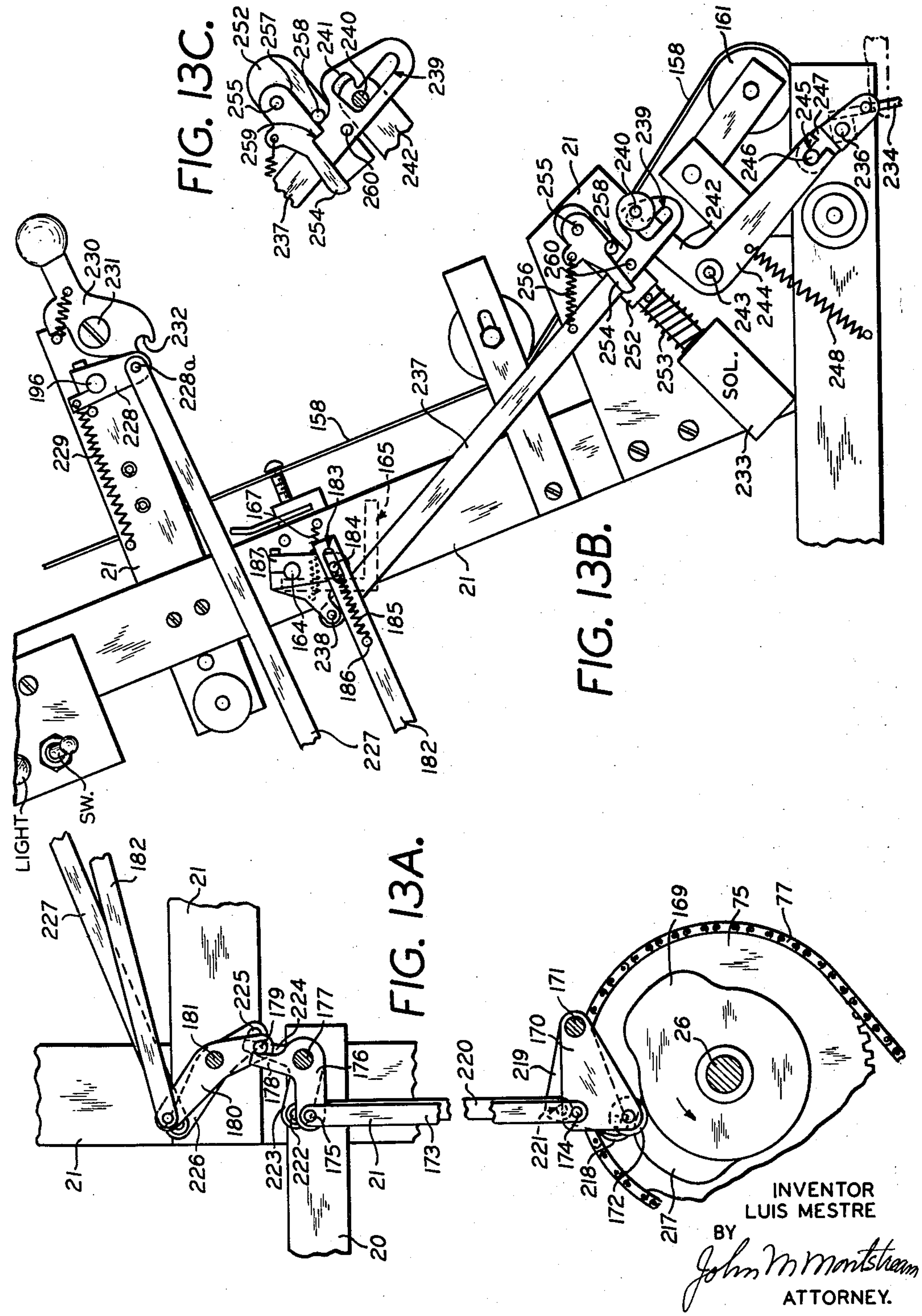
FIG. 13A shows the cams for the stop operating means and the gage operating means.
FIG. 13B shows the stop means, the book ejecting operating means, and part of the gaging means.
FIG. 13C is a partial view of the book ejecting operating means in normal position.

When the solenoid is energized the latch pin 258 is moved downwardly which propels the link 237 downwardly to bring the pin 240 into the later portion 241 of the slot. The latch pin and hence the link is held in this position by the shoulder or notch 259 on the latch. Now when the stop means is withdrawn from stop position the longitudinal movement of the link swings the bell crank lever 242 counterclockwise to swing the reject plate 234 to reject position. The final longitudinal movement of the link 237 brings a latch release pin 260 carried by the reject link into contact with the latch and pivots it clockwise to release the latch pin 258 from the shoulder 259 so that the latch, link 237, reject plate and armature is restored to normal position as shown in FIG. 13C. The pin 240, however, remains in the lateral slot or notch by virtue of the indent until the stop means starts to swing toward stop position whereupon the reject link 237 moves up to bring the pin into the longitudinal portion of the slot. If the armature is not energized, then the pin 240 slides in the longitudinal slot 239 and the reject plate remains in normal position.

Figure 14:
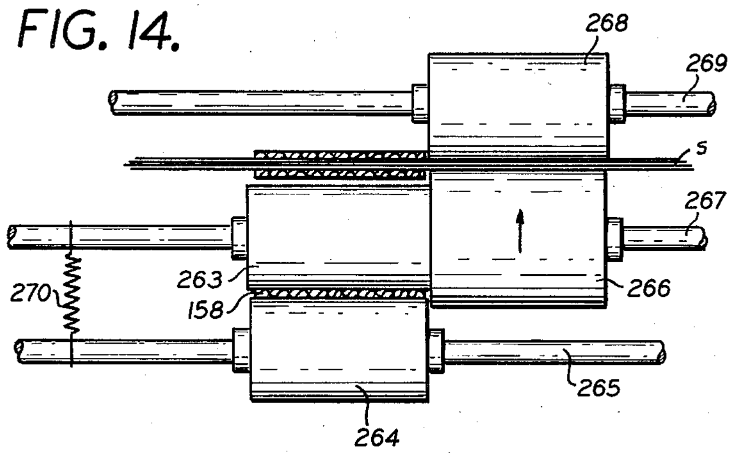
FIG. 14 is an enlarged view taken on line 15—15 of FIG. 10.

It has been mentioned hereinbefore that while the sheets are being transported by the belt means, the leading edge of each sheet of the book of sheets is spaced from the leading edge of the next following sheet. This spacing may be about two inches in the particular construction illustrated where the top sheet in the bottom pocket is fed first and thereafter the sheet from each succeeding pocket is fed at a slightly later time. The book of sheets, therefore, travels along in front of the storage pockets and between the two belts with their leading edges spaced apart as described. When the first sheet engages the stop it is halted thereby and usually all of the sheets are advanced until the leading edge of each sheet engages the stop means. The sheets between the top and the bottom sheets have no positive feed other than the frictional contact with its adjacent moving sheet. In order to assure, however, that all of the sheets are advanced at the stop means with the leading edge in contact with the stop means, in advance feeding means is preferably provided as shown in FIG. 14. Two spaced advance feeders are provided. This advance feeding means is located above the stop means a distance just a little greater than the length of the sheets being collated. Each advance feeder includes a drive roller 263 against which the belt 158 is pressed by a press roller 264 carried by a floating shaft 265 mounted in the frame and pulled against the belt by a spring 270. The press roller assures that roller 263 is driven by contact with the belt. A feed roller 266 having a diameter a little greater than that of the drive roller is secured on the same shaft 267 with their ends contacting or both may be parts of one roller so that both are rotated by the drive roller. This roller presses against a back-up roller 268 carried by a shaft 269 carried by the frame.

If any sheet is not fed with its leading edge into contact with the stop, it halts beneath the advance feeder and rotation of the feed roller 266 engaging the sheet propels the sheet into contact with the stop. In the normal transport of the book of sheets, the most advanced sheet is the outer or first sheet which is in contact with the auxiliary belt means. This sheet is always fed into contact with the stop because it is in contact with the belt. Since the bottom sheet is in contact with the transport belt means and it is the sheet displaced the greatest distance from the first sheet, the friction between this sheet and the adjacent sheet and between the adjacent sheet and the next sheet and so on this frictional characteristic is usually sufficient to feed all of the sheets into contact with the stop. If this should not occur then the advance feeder engages the upper portion of a sheet which has not been advanced into contact with the stop means and propels it into contact therewith.

Figures 15, 16:
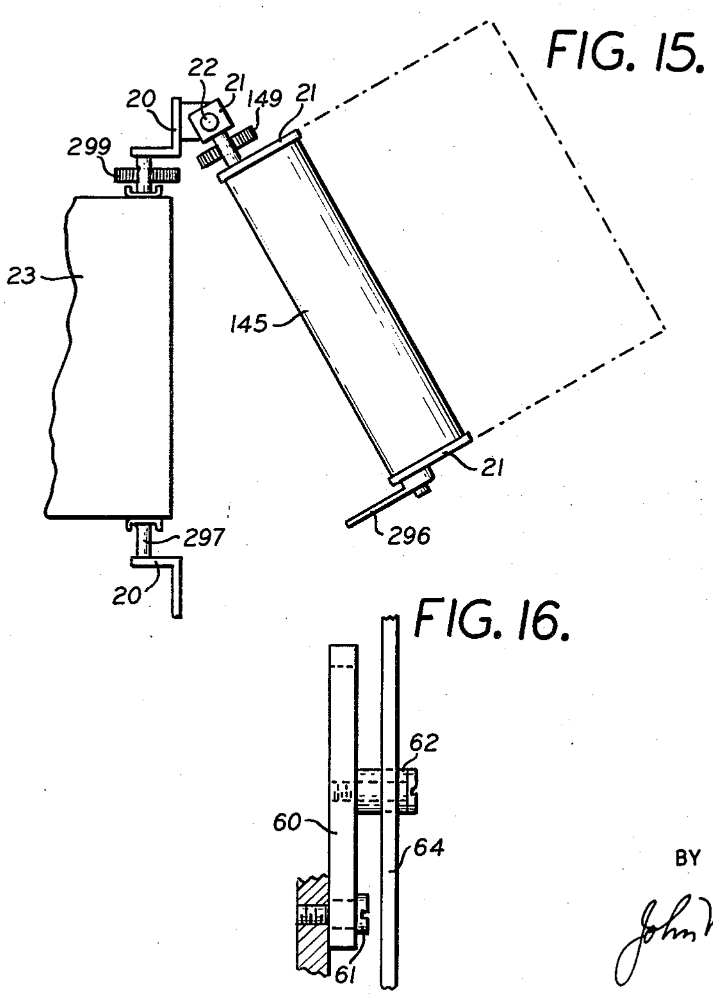
FIG. 15 shows the hinge for the auxiliary frame.
FIG. 16 shows the segmental gear.

The transporting means is pivoted on a hinge 22, FIG. 15, to swing this whole structure away from the rest of the collator. A catch 296 hooks on the brace 297, to hold it in operable position. A driver gear 299, FIG. 10, in the frame 20 and a meshing gear 149 on the auxiliary frame 21 provides a separable drive connection between the shaft 36 and the transporting means. A clutch 298 is provided on cam shaft 74 between the sprocket for the drive chain 77 and the cams 72, 73 so that the ejector and selector means can be idled with the transmission means still functioning to complete the last book collated.

This invention is presented to fill a need for improvements in a collator with fixed storage pockets. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A collator comprising a frame, a plurality of adjacent storage pockets fixed to the frame and each having an ejection end, drive mechanism, an ejector mounted in each storage pocket and engaging the top sheet of a pile of sheets, operating means connecting the drive mechanism with each ejector to operate the same to project the top sheet partially out of its storage pocket; transporting means located at the ejection end of and adjacent to the storage pockets to engage each projected sheet and complete the withdrawal of the sheet from its pocket including a main belt means operatively connected with the drive mechanism, a pressure roll for each storage pocket, means pressing the pressure roll against the main belt means, the main belt means extending adjacent to the storage pockets at least to the last pocket, an auxiliary belt means, means mounting the auxiliary belt means in contact with the main belt means at least at the last pocket and directed away from the last pocket, stop means, means mounting the stop means for lateral movement with respect to the belt means to and from a stop position in the path of the sheets to stop the sheets and align the same, operating means for the stop means operatively connected with the drive mechanism to project and remove the stop means to and from stop position, gaging means operatively connected with the drive mechanism to move the gage means into contact with the sheets to gage the sheets in stop position, and reject means at the end of the belt means and operable by the gage means to bypass the sheets.

2. A collator as in claim 1 in which the ejector includes an ejector wheel, and means rotatably mounting the ejector wheel in a pocket; ejector operating means connected with the ejector wheel to turn the same including an ejector drive shaft, a one direction clutch connected with the ejector drive shaft, a pinion operatively connected with the clutch to turn the same, a gear segment pivotally mounted on the frame and in mesh with the pinion, and means connecting the gear segments with the drive mechanism to oscillate the same.

3. A collator as in claim 2 in which the means to oscillate the gear segments includes a cam bar, means mounting the cam bar for movement adjacent to the gear segments, a cam follower carried by each gear segment, a cam slot in the cam bar for each gear segment and receiving the cam follower secured to the gear segment, and means to oscillate the cam bar.

4. A collator as in claim 3 in which the cam slots are progressively spaced apart a distance less than the spacing of the gear segments to begin the oscillation of the gear segments in sequence from the first storage pocket to the last.

5. A collator as in claim 1 including an auxiliary frame hingedly mounted on the main frame to pivot the same way from the ejecting end of the storage pockets, and the transporting means being carried on the auxiliary frame.

6. A collator as in claim 1 in which the main belt means includes a portion extending away from the last pocket, and the means mounting the auxiliary belt means mounting the same in contact with the extending portion.

7. A collator as in claim 6 in which the storage pockets are arranged vertically, and the main belt means portion extends angularly downwardly away from the storage pockets.

8. A collator as in claim 1 including sheet advancing means spaced from the stop means a distance a little greater than the length of a sheet, and means connecting the sheet advancing means with the auxiliary belt means to drive the same.

9. A collator as in claim 8 in which the auxiliary belt means has a return pass portion, the sheet advancing means includes a pair of rolls with engaging peripheries in line with the belt means, a drive roll secured to one of the pair of rolls and having a diameter less than the roll and engaging the return pass portion to turn the same, and a pressure roll pressing the return pass portion of the auxiliary belt against the drive roll.

10. A collator as in claim 2 including clutch operating means connected with the drive mechanism automatically engaging and disengaging the clutch once for each cycle of operation of the collator.

11. A collator as in claim 10 in which the clutch operating means comprises selector cylinder means including a selector plate for each storage pocket having a periphery, each selector plate including an operative and inoperative notch in the periphery for each storage pocket, a selector finger for each selector plate and mounted for insertion at a selected notch, and a gear change means connecting the drive mechanism with the selector cylinder means.

12. A collator as in claim 11 in which the gear change means includes a gear change carriage, an interlocking means connected between the selector cylinder means and the gear change carriage which locks the latter in adjusted position for all positions of the selector cylinder means except for one position.

13. A collator as in claim 12 in which the interlocking means includes an interlock release lever carried by the gear change carriage, and a lever secured to the selector cylinder means and engaging the interlock release lever in one position of the cylinder means.

14. A collator as in claim 11 in which the clutch operating means includes an operating lever for each selector plate mounted adjacent to its selector plate and connected with its respective clutch, a reset bar mounted adjacent to the operating levers to engage and reset the same, and means connected with the gear change means to operate the reset bar just prior to the completion of one cycle of operation.

15. A collator as in claim 1 in which the reject means includes a reject plate pivotally mounted on the frame, a link operatively connected with the stop means, said link having a longitudinal slot and a lateral slot extending from one end of the longitudinal slot, a pin carried by the link and received in the slot, a solenoid having an armature adjacent the slots in the link, means carried by the armature to propel the link laterally to reject position with the pin in the lateral slot, a latch carried by the armature to hold the link in reject position, means carried by the link to release the latch, means operatively connecting the link with the reject plate, switch means operated by the gaging means connected with the solenoid.

16. A collator as in claim 15 in which the gaging means includes a thin book gaging means and a thick book gaging means, a switch for each gaging means connected with the solenoid, and means to adjust each gaging means.

17. A collator as in claim 16 including means operatively connected with the drive mechanism to propel the gaging means into contact with the book, manual means to hold the gaging means in contact with the book of sheets, and a light connected with the switches to indicate operation of the switches.

No references cited.